United States Patent [19]
Rueckmann

[11] 3,958,253
[45] May 18, 1976

[54] DEVICE FOR THERMALLY RECORDING INDICIA

[75] Inventor: Bernd Rueckmann, Munich, Germany

[73] Assignee: Siemens Aktiengesellschaft, Berlin & Munich, Germany

[22] Filed: Aug. 15, 1974

[21] Appl. No.: 497,768

[30] Foreign Application Priority Data
Sept. 18, 1973 Germany............................ 2346923

[52] U.S. Cl............................. 346/76 L; 346/135
[51] Int. Cl.²......................................... G01D 15/14
[58] Field of Search............... 346/76 R, 76 L, 135, 346/1

[56] References Cited
UNITED STATES PATENTS

| | | | |
|---|---|---|---|
| 3,573,847 | 4/1971 | Sacerdoti | 346/76 L |
| 3,644,014 | 2/1972 | Hirschberg | 346/76 R X |
| 3,787,873 | 1/1974 | Sato | 346/76 L X |
| 3,832,547 | 8/1974 | Silverman | 346/76 L X |

FOREIGN PATENTS OR APPLICATIONS
43-7579  3/1968  Japan............................... 346/76 R

OTHER PUBLICATIONS
Harris et al., *Thermal Printer;* IBM Tech. Disc. Bulletin, Vol. 15, No. 1, June 1972, pp. 213–214.

*Primary Examiner*—Joseph W. Hartary
*Attorney, Agent, or Firm*—Hill, Gross, Simpson, Van Santen, Steadman, Chiara & Simpson

[57] ABSTRACT

A device for recording indicia by directing a high intensity light source against a thin walled material having a high absorption power with respect to light and having a high conductivity in one direction, the thin walled material being positioned adjacent a recording carrier such as a thermally responsive paper, whereby the thin walled material absorbs energy transmitted by the light source and transmits the same as heat to the recording carrier.

5 Claims, 3 Drawing Figures

DEVICE FOR THERMALLY RECORDING INDICIA

BACKGROUND OF THE INVENTION

1. Field of the Invention

This invention relates to a device for recording indicia on paper or similar media.

2. Description of the Prior Art

Paper or similar media which has a large reflection coefficient or a large transparency or both with respect to light and which has a surface which changes in color under the action of heat is well known. Such papers may change color or transparency as a result of the application of a light source or of a heat source.

It has become necessary, in recent years, to increase the speed with which indicia, such as alpha-numeric indicia may be placed upon a record carrier, such as paper. Fast electronic data processing systems require data print-out systems capable of operating at extremely high speed. The inertia of moving parts in mechanical devices limits the recording speeds which can be achieved. In the past, these limits could be overcome only by extremely complex constructions involving extremely high cost.

After the invention of the laser, devices for the printing of indicia by means of a light source of a high intensity were developed. In such devices, the light beam may be shaped to the selected alpha-numeric character and thereafter be directed to act upon color particles located in a color carrier. Such devices include the use of color carriers which are positioned immediately adjacent to the recording media or paper. When a light source is directed at preselected portions of the color carrier, the color particles are transmitted, by way of vaporization, onto the recording carrier or paper. (see, for example, German Auslegeschrift No. 1,957,126).

Devices of this character have the advantage of relative fast and quiet operation due to the elimination of mechanical elements required by the previously known printing devices. However, on the other hand, due to the necessity of maintaining the interposed color carrier, the printing speed is limited by the maximum feed speeds obtainable with the color carrier. Additionally, a moving color carrier requires very intensive maintenance which reduces the overall reliability of the printing device. Thus, for example, special warning devices are necessary to indicate, on the one hand, the end of the color carrier strip or sheet, and on the other hand, to interrupt the writing operation during the exchange or replacement of the color carrier.

SUMMARY OF THE INVENTION

This invention overcomes the deficiencies of the prior recording devices and provides a device for the recording on paper or other such recording carrier, which utilizes no moving color carrier and which, while using a light source of great intensity, creates color change directly on the recording carrier or paper by heat response, while applying the heat only in areas corresponding to the desired character to be reproduced.

Such recording carriers as are known, for example, known papers, and particularly those which are mostly white, have a high reflective ability or a great transparency or both. If a sharply focused light beam, such as a laser, is directed thereagainst, only a small part of the impinging radiation can be absorbed and thus transferred into the heat energy necessary to effectuate color change. In accordance with the teachings of this invention, this absorption level is increased at the time of the recording and in the specific area necessary for the reproduction of the desired character with the resultant ability to reduce the high energy necessary for effectuating printing on the recording carrier.

According to this invention, a thin walled layer of material having a high absorption ability with respect to light and having a high directional heat conductivity, is arranged between a signal responsive light source and a recording carrier. This thin walled layer absorbs the energy transmitted by the light beam and passes it on in the form of heat to the recording carrier.

Inasmuch as in devices according to this invention, it is not necessary to use a color carrier and the alpha-numeric character is immediately produced on the recording carrier by the action of heat, the device has the capability of functioning extremely fast quietly and economically. In particular, all of the mechanisms previously necessary for feeding the color carrier and controlling the mechanism in response thereto are eliminated.

In a particular embodiment of this invention, the contour sharpness of the recorded alpha-numeric character is enhanced by utilizing, as the thin walled material layer, a material which has a heat conductivity as great as possible in the direction of the impinging light and as small as possible in the direction perpendicular thereto. This type of construction, which may be referred to as a polarization of the heat conductivity of the thin walled material layer, not only maintains a desirable contour sharpness of the heat presentation pattern against the recoding carrier, but additionally, reduces the light beam energy level necessary for the creation of the selected character because, among other things, loss of energy due to lateral dissipation of the heat in the thin walled material layer is avoided. In the same manner, because of the high heat conductivity in the direction of the impinging light coupled with the low heat conductivity laterally thereto, there is very little heat retention in the thin walled material layer thereby preventing an undesirable heat buildup therein.

It is therefore an object of this invention to provide an improved device for recording on a recording carrier.

It is a more particular object of this invention to provide an improved device for character recording on heat sensitive paper.

It is a more specific object of this invention to provide a device for indicia recording on a recording media, such as paper, by means of a high intensity light directed in a preselected pattern towards the recording carrier.

It is another, more particular object of this invention to provide for imprinting on a recording carrier by directing a high intensity light at selected areas of a heat transference layer interposed between the light and a recording carrier, the heat transference layer having high conductivity in the direction of the impinging light and low conductivity perpendicularly thereto.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
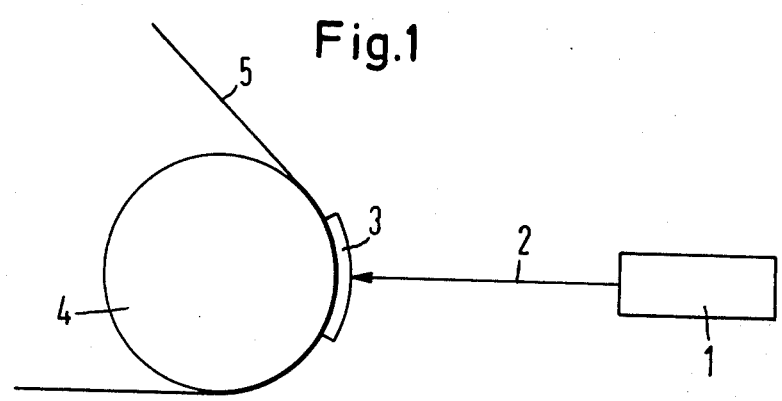
FIG. 1 is a diagrammatic view of a device for indicia recording on paper according to this invention.

FIG. 1 illustrates a device for indicia recording on paper with the aid of the laser beam. The laser beam 2 is controlled in dependent response to a character generator and is emitted from a laser source 1. The beam impinges upon a thin material layer 3. Layer 3 may be approximately 0.1 mm. thick, and which has a high light absorption ability, for example, of approximately 80% with respect to light. The thin material layer 3 is in close surface contact with a recording carrier 5 which may, for example, consist of normal paper which is tautly positioned with respect thereto. For example, the paper may be positioned with respect to the thin walled material layer 3 by means of a platen 4.

According to the nature of the indicia to be recorded the laser beam 2 will contact selective surface portions of the thin material layer 3. These portions of the thin material layer 3 will heat up as a result of the impinging light beam. This heating up of the thin walled material layer will transfer heat directly to the recording carrier 5 whose surface will discolor correspondingly.

The thin walled material layer 3 is constructed with a particularly high absorption ability with respect to light and with a high heat conductivity. The heat conductivity is directional with respect to the paper and the impinging light beam. Thus the heat conductivity of the thin walled material layer 3 is very high in the direction of the impinging laser beam 2 and very low perpendicularly to the beam, preferably having an approximate ratio of 5 to 1. In this manner, accumulation of heat within the thin walled material layer is avoided thus eliminating blurring of the contours of the indicia to be recorded. Due to the use of this thin walled material layer 3, the recording of the indicia on the paper is independent of light reflective factors inherent in the various types of paper and it is not necessary to adapt the intensity of the laser beam to the various types of recording carriers used since the surface discoloration of the recording carrier is caused by the heat proceeding from the thin walled material layer 3 and not from direct impinging light radiation.

Figure 2:
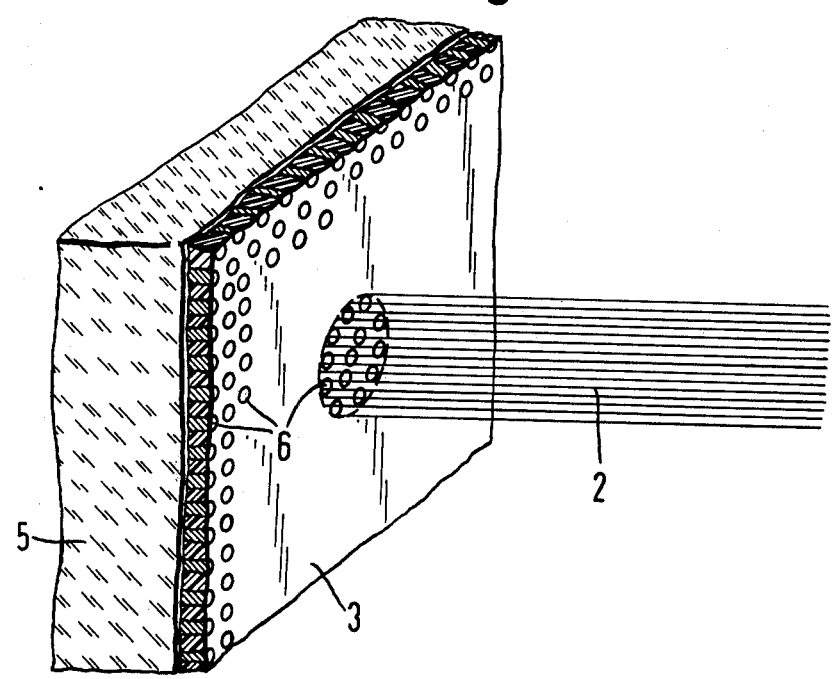
FIG. 2 is a fragmentary greatly enlarged view partially in section of the thin walled material layer according to this invention interposed between a recording carrier and an impinging light beam.

FIG. 2 illustrates a magnified section of an embodiment of the thin walled material layer 3 of FIG. 1. In this embodiment, the material layer consists of a synthetic material having low heat conductivity into which thin rods or pins of very high heat conductivity material, such as metal pins 6, were inserted by way of a sintering process. The pins or rods 6 are arranged in parallel with respect to one another and perpendicular to the surfaces of the thin walled material layer. The pins 6 have a dark color surface facing the laser beam and therefore the pins have a particularly high light absorption ability and a high heat conductivity which heat is then passed on exactly to the recording carrier 5 which is positioned behind the thin walled material layer 3. The sharpness of the character recording ability of this device, is dependent, on the one hand on the diameter of the laser beam 2 and, on the other hand, on the number of incorporated pins 6. The greater the number of pins covered by the laser beam, the more accurately the character which is recorded by the laser beam 2 on the thin walled material 3 will be transferred and reproduced on the recording carrier 5.

Thus a film of photo sensitive material can be exposed to a raster pattern and developed to provide silver particles in an arrangement as illustrated by the pins 6 in FIG. 2. The resulting silver particles provide the high heat conductivity areas.

Figure 3:
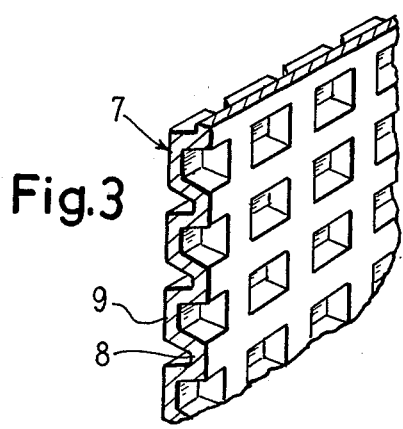
FIG. 3 is a fragmentary enlarged view partially in section of another embodiment of the thin walled material layer of this invention.

Another embodiment of the thin walled material layer of this invention, as shown in FIG. 3, can consist of a waffle-shaped embossed foil 7. In such a construction thin bridge strips 8 connect elevated intermediate surfaces 9. In this instance, the thin strips 8 represent zones of low heat conductivity and the thicker surfaces 9 represent zones of high heat conductivity. Although a hollow waffle pattern is shown in FIG. 3, in some embodiments, a solid waffle pattern may be desirable.

It will be appreciated that this invention is utilizable, in various modifications and forms, with a large variety of recording carriers, including, preferably, that class of recording carriers which comprise papers having an ability to darken or otherwise change color in response to localized heat applications. It should further be appreciated that the herein described thin walled material layer can consist generally of any relatively thin layer capable of high light absorption for the purposes of heat generation, and in which the generated heat is primarily conducted in a single direction within the material, preferably in the direction of the impinging light beam with a minimum heat conductivity perpendicularly or laterally thereto.

It can therefore be seen from the above that my invention provides a apparatus for indicia recording on paper or a similar recording carrier, by means of a light source, preferably a laser beam, which is directed against an intermediately positioned layer of material having a high light absorbing capability and a high heat conductivity in the direction of the impinging light beam and a relatively low heat conductivity in a direction perpendicular to the impinging light beam, the material layer being positioned close to the recording carrier. Although in the preferred embodiment illustrated, the thin walled material layer is described as being in contact with the recording carrier, in other embodiments, it may be desirable to have a minimal gap therebetween.

Although the teachings of my invention have herein been discussed with reference to specific theories and embodiments, it is to be understood that these are by way of illustration only and that others may wish to utilize my invention in different designs or applications.

I claim as my invention:

1. A device for recording indicia on paper having heat responsive surface characteristics comprising: a signal controlled light source of high intensity, a thin material layer, the thin material layer having localized areas of high heat conductivity in a first direction surrounded by areas of low heat conductivity perpendicular to the first direction, the thin material layer being positioned between the light source and the paper on which the indicia is to be recorded and having a relatively high absorption ability with respect to light from the light source, the thin material layer positioned immediately adjacent the paper and effective to absorb the energy transmitted by a light beam from the signal controlled light source impinging thereon, the light source impinging on the thin material layer in the first direction, the thin material layer transforming the light beam energy into heat and effective to conduct said heat to said paper.

2. A device according to claim 1 wherein the thin material layer consists of photographic material exposed to provide localized areas of high heat conductivity in the first direction substantially surrounded by areas of low heat conductivity.

3. A device for recording indicia on paper having heat responsive surface characteristics comprising: a signal controlled light source of high intensity, a thin material layer, the thin material layer being positioned between the light source and the paper on which indicia is to be recorded and having a relatively high absorption ability with respect to light from the light source and a high directional heat conductivity, the thin material layer positioned immediately adjacent the paper and effective to absorb the energy transmitted by a light beam impinging thereon and transforming said energy into heat and conducting said heat to the paper, the thin material layer having a high conductivity in the direction of the impinging light beam from the light source and a low heat conductivity perpendicularly thereto and consisting of a waffle-shaped embossed metal foil.

4. A device for recording indicia on paper and having heat responsive surface characteristics comprising: a signal controlled light source of high intensity, a thin material layer, the thin material layer being positioned between the light source and the paper on which indicia is to be recorded and having a relatively high absorption ability with respect to light from the light source and a high directional heat conductivity, the thin material layer positioned immediately adjacent the paper and effective to absorb the energy transmitted by a light beam impinging thereon and transforming said energy into heat and conducting said heat to the paper, the thin material layer having a high heat conductivity in the direction of the impinging light beam from the light source and a low heat conductivity perpendicularly thereto and consisting of sheet of material having low heat conductivity with a plurality of individual units of high heat conductivity imbedded therein.

5. A device according to claim 4 wherein the units comprise metal rod-like pieces arranged parallel to one another.

* * * * *